United States Patent [19]

Martin et al.

[11] Patent Number: 4,522,878

[45] Date of Patent: Jun. 11, 1985

[54] MATERIAL HAVING HIGH MECHANICAL STRENGTH AND DENSITY CLOSE TO UNITY, THE MANUFACTURE AND USES THEREOF

[75] Inventors: Madeleine Martin, Chatou; Jean Lesage, Maurepas Elancourt; Gérard Courbin, Grigny; Alain Rivereau, Rueil Malmaison, all of France

[73] Assignee: Institut Francais du Petrole, Rueil-Malmaison, France

[21] Appl. No.: 594,047

[22] Filed: Mar. 28, 1984

[30] Foreign Application Priority Data

Mar. 28, 1983 [FR] France ............................... 83 05186

[51] Int. Cl.³ ............................................... B32B 3/26
[52] U.S. Cl. ............................... 428/313.7; 428/313.9; 428/327; 428/328; 428/329; 521/54; 521/187; 521/188; 523/218; 523/219
[58] Field of Search .................. 521/187, 54; 523/218, 523/219; 428/313.7, 313.9, 327, 328, 329

[56] References Cited

U.S. PATENT DOCUMENTS

| 2,806,509 | 9/1957 | Bozzacco et al. | 521/54 |
| 3,562,190 | 2/1971 | Jones et al. | 521/187 |
| 3,795,653 | 3/1974 | Aignesberger et al. | 521/54 |
| 4,005,036 | 1/1977 | Stelego | 521/187 |

*Primary Examiner*—Morton Foelak
*Attorney, Agent, or Firm*—Millen & White

[57] ABSTRACT

A material with high mechanical strength and a density close to 1 is obtained by:

(a) dispersing on weight basis 10–15% of a melamine-formol resin, 10–50% of hollow microspheres, and optionally up to 60% of light aggregates, in water;

(b) mixing the resultant dispersion in the presence of a cross-linking catalyst, e.g., ammonium chloride, for the melamine-formol resin, until a fluid paste is obtained; and (c) allowing said fluid paste to harden into the desired material.

14 Claims, No Drawings

MATERIAL HAVING HIGH MECHANICAL STRENGTH AND DENSITY CLOSE TO UNITY, THE MANUFACTURE AND USES THEREOF

BACKGROUND OF THE INVENTION

This invention relates to new solid materials of very high mechanical strength and having a density on the order of 1 g/cm$^3$; it also relates to a process for manufacturing these materials, as well as the uses thereof.

For numerous marine applications, related more especially to the working of offshore oil deposits, and the utilization of the heat energy of the oceans, it is important to have available those materials having both a very high mechanical strength (in particular resistance to hydrostatic compression) and a density close to that of water. These properties are difficult to associate together and the conventional materials are in general insufficient from the point of view of one or the other of these properties.

OBJECTS OF THE INVENTION

The object of the invention is precisely to provide materials combining these two properties in an unexpected way and further having other advantages which will appear from the following description.

Since the composition of these new materials and the method used for preparing them is, mutatis mutandis, similar to those of traditional hydraulic mortars and concretes, they will sometimes be designated hereafter by the term "resin concretes".

SUMMARY OF THE INVENTION

The present invention provides then materials having a density close to 1 g/cm$^3$, going for example from 0.7 to 1.15 g/cm$^3$ and a high mechanical strength, these materials being able to be defined as resulting from a process which comprises:

a step (a) in which a melamine-formaldehyde resin, hollow microspheres and possibly light aggregates are dispersed in water;

a step (b) in which the dispersion thus formed is mixed, in the presence of a setting catalyst, until a fluid paste is obtained and a step (c) in which said fluid paste is allowed to harden to the desired material.

The melamine-formaldehyde resins used in the composition of the materials of the invention may consist of the products from the condensation in an alkaline medium of melamine and formaldehyde in proportions going for example from about 3 to 6 moles of formaldehyde per mole of melamine.

They are in general in the form of a powder having for example a densities of 1210–1220 kg/m$^3$. They are easy to disperse in water.

The hollow microspheres which are used may consist in particular of "microballs" with a glass or ceramic envelope. For reasons of cost, cenospheres are used designated by "floating spherules", which are obtained by flotation separation from fly-ash collected from the smoke of boilers (for example thermal power stations) operating with pulverized coal. Their apparent densities is in general about 200 to 450 kg/m$^3$.

The hollow microspheres used may for example have dimensions from 20 to 200 μm.

As light aggregates, materials are used which usually used in the formation of light concretes, and having for example apparent densities of about 0.75 to 1.1 g/cm$^3$. Expanded clay and expanded schist may be mentioned. The real densities may range for example from about 0.9 to 1.5 g/cm$^3$.

In the preparation of the materials of the invention, the melamine formaldehyde resin, the hollow microspheres and the light aggregates may be used in varying proportions. These proportions depend on the desired density for the final material.

Generally, the different constituents may be used in proportions on the basis of the total of said constituents, ranging from 10 to 50% by weight, preferably from 15 to 40% by weight, for the melamine formaldehyde resin, from 10 to 50% by weight, preferably from 15 to 40% by weight, for the hollow microspheres and up to 60% by weight, preferably 25 to 60% by weight, for the light aggregates.

In step (a) of the process for preparing the materials of the invention, the above mentioned constituents are dispersed in a proportion of water which may range for example from 10 to 30% by weight, preferably from 10 to 25% by weight with respect to the total weight of said constituents.

The water may contain the setting catalyst at the outset, whose nature and amount are chosen, generally, as a function of the temperature used and of the setting times imposed. The "setting", such as is understood in the present invention, consists in hardening of the melamine-formaldehyde resin by cross-linking. The "setting catalyst" may consist of any compound capable of promoting this hardening.

Thus, different water-soluble compounds with a weak acid character such as ammonium chloride may be used as the catalyst, in particular if the setting is to be carried out at an ambient temperature of about 20° C., or else tartaric acid, in particular if the setting is to be carried out between 5° and 10° C. Basic compounds may further be used such as aqueous ammonia, if the hardening is to be carried out at a temperature higher than the ambient temperature, for example from 50° to 60° C.

The different constituents of the material may first of all be introduced as a dispersion in water and the setting catalyst only added subsequently, for example in the form of an aqueous solution.

In both cases, the proportion of setting catalyst used may vary for example from 1 to 3% by weight with respect to the resin.

By mixing the dispersion thus formed, a fluid paste is obtained which "sets" and hardens under the action of the catalyst, so as to produce the final desired material.

The materials of the invention have, depending on the proportions of the constituents used for their preparation, a density which may range for example from 0.7 to 1 g/cm$^3$ or a little more, up to about 1.15 g/cm$^3$. Their mechanical strength under compression is high. Measured after 28 days at 20° C., it may reach for example 28 or 30 MPa or even more. Their breaking strength under bending is good. The values measured after 28 days at 20° C. may for example be between 3.5 and 5 MPa.

The association of a low density and a high mechanical strength makes the use of the materials described in the invention particularly advantageous in the construction of works for marine applications.

They may in particular be used for manufacturing tubes for conveying seawater in the process of using the thermal energy of the seas, because of their high mechanical strength associated with a density close to that of the seawater. The tubes may thus withstand the hydrostatic pressures without being subjected to high traction forces.

These materials may also be used in many other maritime applications, such as the manufacture of floats for marinas or yachting ports, automatic signalling panels, the masonary bases for metal bridges, barges and pontoons, without this list being limitative.

They may finally be used, in a general way, for any application where a considerable gain in weight combined with high mechanical strength is required. In these applications, the objects manufactured from the material of the invention may be coated with a reinforced plastic material coating for sealing them, which is particularly advantageous in the case of the construction of tubes for using the heat energy of the seas. As reinforced plastic material, epoxy resins reinforced with glass fibers may for example be mentioned.

The following examples illustrate the invention. They should nowise limit the scope thereof.

EXAMPLES 1 TO 3

In these examples, a melamine-formaldehyde resin is used which is commercially available (Madurit MW 905, sold by the French firm HOECHST), which is in the form of a powder with a density of 1210-1220 kg/m$^3$.

The procedure is as follows:

First of all the melamine-formaldehyde resin is mixed with the hollow microspheres (floating spherules) having a density of 670 kg/m$^3$, comprising a granulometric fraction less than 74 μm of 23% and a granulometric fraction greater than 147 μm of 18%.

The water containing the catalyst which consists of ammonium chloride and finally the aggregates (expanded clay in examples 1 and 2, expanded schist in example 3) are added.

The mixing operation is carried out at ambient temperature.

The amounts of the constituents used for the preparation, in each case, of one cubic meter of "resin concrete" are given in the following table. Different characteristics of the fresh mixture (before setting) and of the ∓resin concrete" obtained are also shown in this table.

In particular, the workability of the fresh mixture determined with the "LCPC" apparatus for measuring workability, perfected at the Laboratoire Central des Ponts et Chaussées, is the time (expressed in seconds) required for spreading it under given conditions. Furthermore, the mass variation (in %) is determined after a dwell time of 14 days in a humid chamber then 14 days in water under atmospheric pressure.

TABLE

| EXAMPLE | 1 | 2 | 3 |
|---|---|---|---|
| Constituents | | | |
| Melamine-formol resin (kg) | 242 | 205 | 207 |
| water (l) | 170 | 136 | 127.5 |
| Cenospheres (kg) | 262 | 204 | 205 |
| expanded clay aggregates (kg) | 210 | 453 | — |
| expanded schist aggregates (kg) | — | — | 588 |
| catalyst (kg) | 3.65 | 3.08 | 3.08 |
| Characteristics | | | |
| Workability of the fresh LCPC(s) mixture | 12 | 9 | 9 |
| Voluminal mass on removal from the mold (kg/m$^3$) | 850 | 970 | 1130 |
| Bending strength after 28 days (MPa) | 3.8 | 4.8 | 4.9 |
| Compression strength after 28 days (MPa) | 18.5 | 28.5 | 30 |
| Mass variation (%) | +0.9 | +0.43 | +0.93 |

What is claimed is:

1. A material with high mechanical strength and a density of about 0.70 to 1.15 g/cm$^3$, characterized in that it is obtained by a process which consists essentially of:
   - a step (a), in which a composition consisting essentially of melamine-formaldehyde resin, hollow microspheres having an apparent density of about 200 to 450 kg/m$^3$ and being other than clay or schist and light aggregates having an apparent density of about 0.75 to 1.1 g/cm$^3$ and being selected from the group consisting of expanded clay and expanded schist is dispersed in water, the proportions of the constituents used range from 10 to 50% by weight, for the melamine-formaldehyde resin, from 10 to 50% by weight for the hollow microspheres and less than 60% by weight for the light aggregates,
   - a step (b), in which the dispersion thus formed is mixed, in the presence of a cross-linking catalyst for the melamine-formaldehyde resin, until a fluid paste is obtained;
   - a step (c), in which said fluid paste is allowed to harden at a temperature from 5° C. to 60° C. into the desired material.

2. The material as claimed in claim 1, wherein the melamine-formaldehyde resin consists of the product of condensation in an alkaline medium of melamine and formaldehyde in proportions of about 3 to 6 moles of formaldehyde per mole of melamine.

3. The material as claimed in claim 1, wherein the hollow microspheres consists of microballs with a glass or ceramic envelope, or floating spherules obtained by flotation separation from fly-ash collected from the smoke of boilers using pulverized coal, and they have a granulometry of about 20 to 200 μm.

4. The material as claimed in claim 1, wherein the water represents 10 to 30% by weight with respect to the weight of said constituents.

5. The material as claimed in claim 1, wherein the proportions of constituents used are from 15 to 40% by weight for the melamine-formaldehyde resin, from 15 to 40% by weight for the hollow microspheres and from 25 to 60% by weight for the light aggregates and the water represents from 10 to 25% by weight with respect to the weight of said constituents.

6. The material as claimed in claim 1, wherein the cross-linking catalyst is ammonium chloride, tartaric acid or aqueous ammonia.

7. The material as claimed in claim 1, wherein the cross-linking catalyst is used in a proportion of 1 to 3% by weight with respect to the resin.

8. Article according to claim 10, wherein said articles are coated with a sealing coating made from a reinforced plastic material.

9. The material as claimed in claim 1, wherein the proportion of the light aggregate is 25 to 60% by weight.

10. Articles of manufacture suitable for marine application composed of the material of claim 1.

11. An article according to claim 10, in the form of a tube.

12. A tube according to claim 11, coated with a sealing coating made from a reinforced plastic material.

13. A tube according to claim 12, wherein the reinforced plastic material is an epoxy resin glass fiber system.

14. A material according to claim 1 having a compressive strength of 18.5 to 30 MPa and a bending strength of 3.5 to 5 MPA measured after 28 days at 20° C.

* * * * *